(12) United States Patent
Lai

(10) Patent No.: US 12,372,759 B2
(45) Date of Patent: Jul. 29, 2025

(54) IMAGING LENS

(71) Applicant: Young Optics Inc., Hsinchu (TW)

(72) Inventor: Ching-Lung Lai, Hsinchu County (TW)

(73) Assignee: Young Optics Inc., Hsinchu (TW)

( * ) Notice: Subject to any disclaimer, the term of this patent is extended or adjusted under 35 U.S.C. 154(b) by 346 days.

(21) Appl. No.: 17/900,871

(22) Filed: Sep. 1, 2022

(65) Prior Publication Data
US 2023/0081121 A1    Mar. 16, 2023

(30) Foreign Application Priority Data
Sep. 2, 2021   (TW) .................................. 110132702

(51) Int. Cl.
| G02B 13/14 | (2006.01) |
| G02B 9/12 | (2006.01) |
| G02B 9/16 | (2006.01) |
| G02B 13/18 | (2006.01) |
| G02B 27/00 | (2006.01) |

(52) U.S. Cl.
CPC ............... *G02B 13/14* (2013.01); *G02B 9/16* (2013.01); *G02B 13/18* (2013.01); *G02B 27/0093* (2013.01)

(58) Field of Classification Search
CPC ............................. G02B 13/14; G02B 13/146

USPC .................................................. 359/355–357
See application file for complete search history.

(56) References Cited

U.S. PATENT DOCUMENTS

| 10,302,907 B2 | 5/2019 | Asami et al. | |
| 2012/0212808 A1* | 8/2012 | Watanabe | G02B 13/14 |
| | | | 359/357 |
| 2017/0227742 A1* | 8/2017 | Hsieh | G02B 27/027 |
| 2017/0235097 A1* | 8/2017 | Tsai | G02B 5/208 |
| | | | 359/356 |
| 2019/0179116 A1* | 6/2019 | Huang | G02B 13/16 |
| 2024/0288672 A1* | 8/2024 | Matsushita | G02B 13/18 |

FOREIGN PATENT DOCUMENTS

| CN | 106842519 | 6/2017 |
| CN | 207301457 | 5/2018 |
| CN | 110531505 | 2/2020 |
| CN | 111061046 | 4/2020 |

* cited by examiner

*Primary Examiner* — Darryl J Collins
(74) *Attorney, Agent, or Firm* — JCIPRNET

(57) ABSTRACT

An imaging lens including an aperture stop, a first lens, a second lens and a third lens sequentially arranged along an optical axis from an object side to an image side is provided. The first lens is an aspheric glass lens and has positive refracting power. The second lens is an aspheric plastic lens. The third lens is an aspheric plastic lens. The imaging lens has the transmittance higher than 85% for light with a wavelength of 940 nm and has the field of view less than 90 degrees.

20 Claims, 5 Drawing Sheets

IMAGING LENS

CROSS-REFERENCE TO RELATED APPLICATION

This application claims the priority benefit of Taiwan application serial no. 110132702, filed on Sep. 2, 2021. The entirety of the above-mentioned patent application is hereby incorporated by reference herein and made a part of this specification.

BACKGROUND

Technical Field

The disclosure relates to an optical element, and particularly relates to an optical imaging lens.

Description of Related Art

A driver monitoring system (DMS) is an automobile safety system that monitors the driver's attention and may work together with a collision prevention system. As autonomous driving technologies have been drawing attention in recent years, the national highway traffic safety administration (NHTSA) of the United States has defined autonomous vehicles into five different development levels. Among the levels, the third level is "conditional autonomous driving", i.e., "there is a potential need to monitor the driver to ensure that the driver is ready to take over the vehicle at any time when autonomous driving is switched to manual driving". Many automakers have recently included the autonomous driving function that meet the third level in their product development schedules.

When the DMS is used to detect the driving behaviors and facial expressions of the driver, it is necessary to select a suitable light source. In order to reduce the interference of ambient light, the intensity of the light source needs to exceed the intensity of the ambient light, but light with high intensity may cause interference to human eyes. Therefore, it is preferable to adopt invisible light as the light source, making near-infrared light a favorable candidate for the DMS. Lenses in the DMS need to have good imaging capabilities within the waveband of near-infrared light, so that DMS can function properly under a complicated lighting condition, such as at night and backlighting.

SUMMARY

The disclosure provides an imaging lens suitable for a driver monitoring system (DMS), security control, and face recognition. In addition, the lens is miniaturized and the manufacturing cost of the lens can be effectively reduced. Meanwhile, the lens can satisfy imaging quality requirements within the waveband of near infrared light as well as temperature drift requirements.

According to an aspect, the disclosure provides an imaging lens including an aperture stop, a first lens, a second lens and a third lens sequentially arranged along an optical axis from an object side to an image side. The first lens is an aspheric glass lens. The second lens is an aspheric plastic lens. The third lens is an aspheric plastic lens. A diameter of the first lens is smaller than a diameter of the second lens, and the diameter of the second lens is smaller than a diameter of the third lens. The imaging lens has a transmittance higher than 85% for light with a wavelength of 940 nm, and has a field of view less than 90 degrees. The imaging lens satisfies a condition of $D1/LT<0.62$, where LT is a distance between outer surfaces of two outermost lenses of the imaging lens on the optical axis, and D1 is a distance between two points farthest away from each other on an edge of an area of the first lens exposed by the aperture stop.

According to another aspect, the disclosure provides an imaging lens including an aperture stop, a first lens, a second lens, and a third lens. The first lens is an aspheric glass lens with a positive refracting power. The second lens and the third lens are two aspheric lenses. The aperture stop is located at the outermost side of all lenses of the imaging lens. A distance between outer surfaces of two outermost lenses of the imaging lens on the optical axis is less than 4.2 mm, and a field of view of the imaging lens is less than 90 degrees. The imaging lens has a transmittance higher than 85% for light with a wavelength of 940 nm. The imaging lens satisfies a condition of $0.67<EFL1/EFL<1.11$, where ELF1 is an effective focal length of the first lens, and ELF is an effective focal length of the imaging lens.

According to still another aspect, the disclosure provides an imaging lens including an aperture stop, a first lens, a second lens and a third lens sequentially arranged along an optical axis from an object side to an image side. The lenses are all aspheric lenses, and the first lens is an aspheric glass lens. The imaging lens has a transmittance higher than 85% for light with a wavelength of 940 nm, and has a field of view less than 90 degrees. The imaging lens satisfies a condition of $1.5<CT3/ET3<3$, where CT3 is a center thickness of the third lens, and ET3 is an edge thickness of the third lens.

Based on the above description, three aspheric lenses are adopted for the imaging lens provided by the embodiments of the disclosure, and one of the lenses is a glass lens. Thus, the lens is miniaturized, and the manufacturing cost can be reduced effectively. Meanwhile, the imaging quality requirements within the waveband of near infrared light as well as temperature drift requirements are satisfied.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
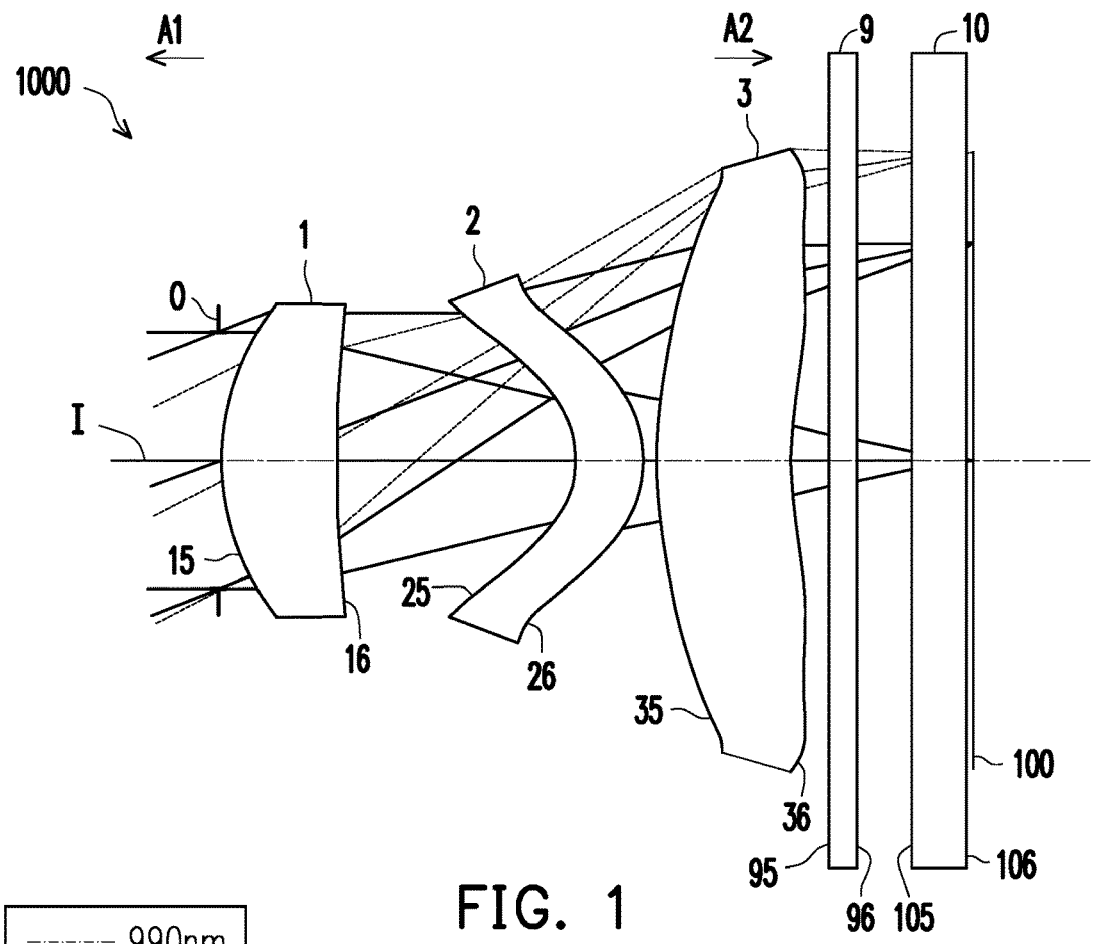
FIG. 1 is a schematic diagram of an imaging lens according to a first embodiment of the disclosure.

Referring FIG. 1 first, an imaging lens 1000 of a first embodiment of the disclosure includes an aperture stop 0, a first lens 1, a second lens 2, a third lens 3, a filter 9, and the cover glass 10 sequentially arranged along an optical axis I of the imaging lens 1000 from an object side A1 to an image side A2, where the first lens 1 is an aspheric glass lens, and the second lens 2 and the third lens 3 are aspheric plastic lenses. When a light beam emitted by an object to be photographed enters the imaging lens 1000, and sequentially passes through the aperture stop 0, the first lens1, the second lens2, the third lens3, the filter 9 and the cover glass 10, an image is formed on an imaging plane 100. The aperture stop 0 is set to determine a size of the incident light beam, thereby achieving good imaging quality. The filter 9 is, for example, an infrared pass filter, which allows light with an appropriate wavelength to pass through and filters out desired wavelength bands. The filter 9 is disposed between the third lens 3 and the cover glass 10. It should be noted that the object side A1 is the side facing the object to be photographed, and is also referred to as an amplification side. The image side A2 is the side facing the imaging plane 100, and is also referred to as a contraction side. In the embodiment, the first lens 1 may also be an aspheric glass film lens.

In the embodiment, the first lens 1, the second lens 2, the third lens 3, the filter 9 and the cover glass 10 of the imaging lens 1000 respectively have object side surfaces 15, 25, 35, 95, 105 that face the object side A1 and allow an image beam to pass through, and the image side surfaces 16, 26, 36, 96, 106 that face the image side A2 and allow the image beam to pass through.

The first lens 1 has a positive refracting power. Both of the object side surface 15 and the image side surface 16 of the first lens 1 are aspheric surfaces. The second lens 2 has a positive refracting power. Both of the object side surface 25 and the image side surface 26 of the second lens 2 are aspheric surfaces. The third lens 3 has a positive refracting power. Both of the object side surface 35 and the image side surface 36 of the third lens 3 are aspheric surfaces. In an embodiment, diameter of the first lens 1 is smaller than a diameter of the second lens 2, and the diameter of the second lens 2 is smaller than a diameter of the third lens 3, wherein each diameter refers to a diameter of the corresponding entire lens (including a support portion).

Other detailed optical data of the first embodiment is shown in Table 1 below, and an effective focal length (EFL) of the imaging lens 1000 of the first embodiment is 4.1 millimeters (mm), and a full field of view (FOV) is 55°, a total lens length TTL of the imaging lens 1000 on the optical axis I is 5.5 mm, an F-number (Fno) is 2.1, and the maximum image height is 2.264 mm, where the total lens length refers to a distance from the object side surface 15 of the first lens 1 to the imaging surface 100 on the optical axis I. It should be noted that a radius of curvature of the object side surface 15 shown in Table 1 refers to a radius of curvature of the object side surface 15 of the first lens 1 in an optical axis region, and a radius of curvature of the image side surface 16 refers to a radius of curvature of the image side surface 16 of the first lens 1 in the optical axis region, and so on. A space of the object side surface 15 (which is 0.84 mm as shown in Table 1) refers to a distance between the object side surface 15 and a next surface (which is the image side surface 16 in the embodiment) on the optical axis I, i.e., a thickness of the first lens 1 on the optical axis I (i.e. a center thickness of the first lens 1) is 0.84 mm. A space of the image side surface 16 (which is 1.74 mm as shown in Table 1) refers to a distance between the image side surface 16 and the object side surface 25 on the optical axis I, i.e., a gap between the first lens 1 and the second lens 2 on the optical axis I is 1.74 mm, and so on.

Regarding the object side surface 15, a distance D1 between two points farthest away from each other on an edge of an area of the first lens 1 exposed by the aperture stop 0 of the imaging lens 1000 is approximately equal to an effective diameter (i.e. a diameter of a clear aperture) of the object side surface 15 of the first lens 1. Regarding the object side surfaces 25 and 35 and the image side surfaces 16, 26, 36, each diameter refers to a diameter of the corresponding entire lens (including a support portion).

TABLE 1

First embodiment
EFL = 4.1 mm, full FOV = 55°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Object | | Infinite | 750 | | | |
| Aperture stop 0 | | Infinite | 0.00 | | | 0.96 |
| First lens 1 | Object side surface 15 | 1.85 | 0.84 | 1.50 | 82 | 1.15 |
| | Image side surface 16 | 11.64 | 1.74 | | | 1.14 |
| Second lens 2 | Object side surface 25 | −0.74 | 0.50 | 1.64 | 23.5 | 1.17 |
| | Image side surface 26 | −0.87 | 0.10 | | | 1.36 |
| Third lens 3 | Object side surface 35 | 2.56 | 0.99 | 1.64 | 23.5 | 2.14 |
| | Image side surface 36 | 2.24 | 0.27 | | | 2.28 |

TABLE 1-continued

First embodiment
EFL = 4.1 mm, full FOV = 55°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Filter 9 | Object side surface 95 | Infinite | 0.21 | 1.52 | 64 | 3.00 |
|  | Image side surface 96 | Infinite | 0.40 |  |  | 3.00 |
| Cover glass 10 | Object side surface 105 | Infinite | 0.40 | 1.52 | 64 | 3.00 |
|  | Image side surface 106 | Infinite | 0.05 |  |  | 3.00 |
|  | Imaging plane 100 | Infinite | 0.00 |  |  | 2.27 |

According to FIG. 1 and Table 1, the first lens 1 is a concavo-convex lens with a convex surface facing the object side A1, where the object side surface 15 thereof is the convex surface, and the image side surface 16 is a concave surface. The second lens 2 is a convexo-concave lens with a convex surface facing the image side A2, where the object side surface 25 thereof is a concave surface, and the image side surface 26 is the convex surface. The third lens 3 is a convexo-concave lens with a convex surface facing the object side A1, where the object side surface 35 thereof is the convex surface, and the image side surface 36 is a concave surface and has an inflection point. A center thickness CT3 of the third lens 3 is 0.99 mm, and an edge thickness ET3 is 0.50 mm, which satisfies a condition of 1.5<CT3/ET3<3.

In the embodiment, the imaging lens 1000 has a transmittance higher than 85% for light with a wavelength of 940 nm. A distance LT between the object side surface 15 of the first lens 1 and the image side surface 36 of the third lens 3 on the optical axis I is 4.17 mm, a distance D1 between two points farthest away from each other on an edge of an area of the first lens 1 exposed by the aperture stop 0 is 2.3 mn, wherein the distance D1 is approximately equal to an effective diameter (i.e. a diameter of an clear aperture) of the object side surface 15 of the first lens 1. An effective diameter DL of the image side surface 36 of the imaging lens 1000 closest to the image side A2 is 4.56 mm. The imaging lens 1000 satisfies conditions of D1/DL <0.6 and D1/LT<0.6. According to an embodiment of the disclosure, the first lens 1 may be black.

In the embodiment, the object side surfaces 15, 25, 35 and the image side surfaces 16, 26, 36 of the first lens 1, the second lens 2, and the third lens 3 (total six surfaces) are all aspheric surfaces, and these aspheric surfaces are defined by the following equation:

$$Z(Y) = \frac{Y^3}{R}\left/\left(1 + \sqrt{1 - (1+K)\frac{Y^2}{R^3}}\right)\right. + \sum_{i=1}^{n} a_{2i} \times Y^{2i} \quad (1)$$

Y: a distance between a point on the aspheric curve and the optical axis;
Z: a depth of the aspheric surface, i.e., a vertical distance between a point on the aspheric surface that has a distance of Y from the optical axis and a tangent plane tangent to the vertex on the optical axis of the aspheric surface;
R: a radius of curvature of the lens surface
K: cone coefficient $a_{2i}$: 2i order aspheric coefficient In the embodiment, the aspheric coefficients of the above aspheric surfaces in the equation (1) are shown in Table 2 below. Where, a column number 15 in Table 2 represents the aspheric coefficients of the object side surface 15 of the first lens 1, and the other columns may be deduced by analogy.

TABLE 2

| Surface | R | K | $a_4$ | $a_6$ |
|---|---|---|---|---|
| 15 | 1.85 | −0.41 | 1.36E−02 | −1.34E−02 |
| 16 | 11.64 | 0.00 | −1.37E−03 | 3.74E−02 |
| 25 | −0.74 | −0.64 | −6.89E−02 | 1.19E−01 |
| 26 | −0.87 | −0.63 | −1.97E−01 | 6.65E−01 |
| 35 | 2.56 | −38.46 | 2.13E−02 | −2.01E−02 |
| 36 | 2.24 | −17.35 | −7.00E−02 | 1.14E−02 |

| Surface | $a_8$ | $a_{10}$ | $a_{12}$ | $a_{14}$ |
|---|---|---|---|---|
| 15 | 1.48E−02 | 4.41E−03 | −1.37E−02 | 5.30E−03 |
| 16 | −9.96E−02 | 1.37E−01 | −9.60E−02 | 2.62E−02 |
| 25 | −6.38E−01 | 1.76E+00 | −1.48E+00 | 4.24E−01 |
| 26 | −1.20E+00 | 1.24E+00 | −5.86E−01 | 1.05E−01 |
| 35 | 1.62E−02 | −5.89E−03 | 1.02E−03 | −7.00E−05 |
| 36 | 7.01E−03 | −2.96E−03 | 4.23E−04 | −2.31E−05 |

Figures 2A, 2B, 2C, 2D:
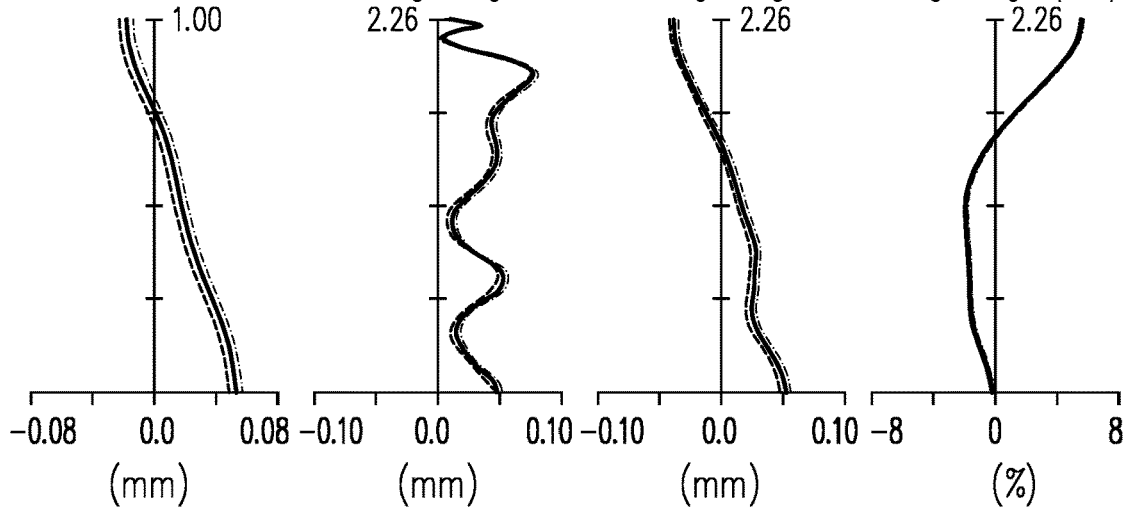
FIG. 2A to FIG. 2D illustrate longitudinal spherical aberration and various aberrations of the imaging lens of the first embodiment.

Referring to FIG. 2A to FIG. 2D, FIG. 2A illustrates a longitudinal spherical aberration of the first embodiment, FIG. 2B and FIG. 2C respectively illustrate a field curvature aberration in a tangential direction and a field curvature aberration in a Sagittal direction on the imaging plane 100 when wavelengths of the first embodiment are respectively 890 nm, 940 nm and 990 nm, and FIG. 2D illustrates a distortion aberration on the imaging plane 100 when wavelengths of the first embodiment are respectively 890 nm, 940 nm and 990 nm. In the longitudinal spherical aberration diagram of the first embodiment of FIG. 2A, it may be seen from a deflection amplitude of a curve of each representative wavelength that deviation of imaging points of off-axis rays of different heights is controlled within ±0.06 millimeters (mm), so that the first embodiment does have good spherical aberration performance for the same wavelength. In addition, distances between the three representative wavelengths are also quite close to each other, which represents that imaging positions of light of different wavelengths are quite concentrated to achieve good chromatic aberration performance.

In the two field curvature aberration diagrams in FIG. 2B and FIG. 2C, the field curvature aberrations of the three representative wavelengths in the entire field of view fall within ±0.09 mm, which means that the optical system of the first embodiment may effectively eliminate aberrations. The distortion aberration diagram in FIG. 2D shows that the distortion aberration of the first embodiment is maintained within a range of ±7%, indicating that the distortion aberration of the first embodiment meets the imaging quality requirements of the optical system, so that compared with the existing imaging lens, the first embodiment uses three aspheric lenses, where one of them is a glass lens, to realize miniaturization of the imaging lens while satisfying the imaging quality requirements within the waveband of near infrared light and the temperature drift requirements.

In order to fully describe various implementations of the disclosure, other embodiments of the disclosure will be described below. It should be noticed that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 3:
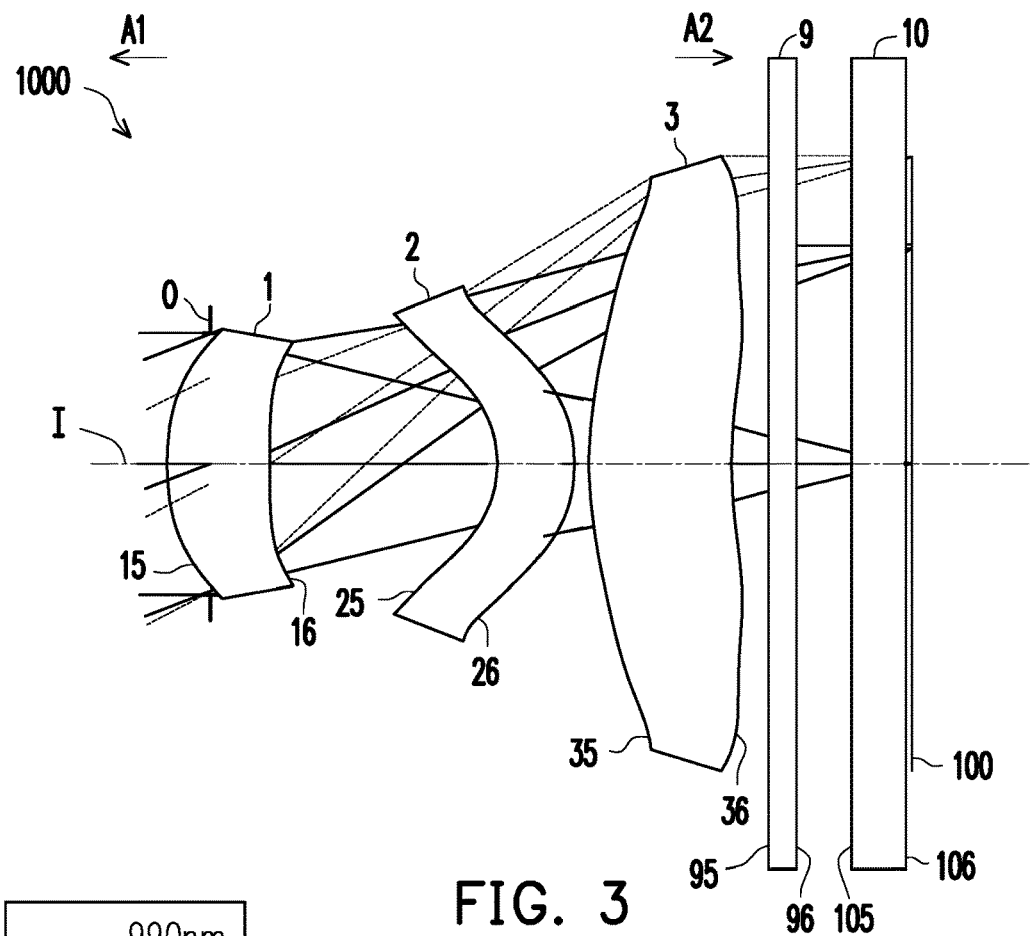
FIG. 3 is a schematic diagram of an imaging lens according to a second embodiment of the disclosure.

FIG. 3 is a schematic diagram of an imaging lens according to a second embodiment of the disclosure, and FIG. 4A to FIG. 4D are diagrams of longitudinal spherical aberration and various aberrations of the imaging lens of the second embodiment. Referring to FIG. 3, the imaging lens 1000 of the second embodiment of the disclosure includes the aperture stop 0, the first lens 1, the second lens 2, the third lens 3, the filter 9, and the cover glass 10 sequentially arranged along the optical axis I of the imaging lens 1000 from the object side A1 to the image side A2, where the first lens 1 is an aspheric glass lens, and the second lens 2 and the third lens 3 are aspheric plastic lenses. In an embodiment of the disclosure, the first lens 1 may be an aspheric glass molded lens.

The first lens 1 has a positive refracting power. Both of the object side surface 15 and the image side surface 16 of the first lens 1 are aspheric surfaces. The second lens 2 element has a negative refracting power. Both of the object side surface 25 and the image side surface 26 of the second lens 2 are aspheric surfaces. The third lens 3 has a positive refracting power. Both of the object side surface 35 and the image side surface 36 of the third lens 3 are aspheric surfaces.

Other detailed optical data of the second embodiment is shown in Table 3 below, and an effective focal length of the imaging lens 1000 of the second embodiment is 4.1 mm, a full field of view is 54°, a total lens length TTL of the imaging lens 1000 on the optical axis I is 5.5 mm, an F-number (Fno) is 2.1, and the maximum image height is 2.264 mm.

TABLE 3

Second embodiment
EFL = 4.1 mm, full FOV = 54°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Object | | Infinite | 751 | | | |
| Aperture stop 0 | | Infinite | −0.32 | | | 0.95 |
| First lens 1 | Object side surface 15 | 1.54 | 0.75 | 1.50 | 82 | 1.00 |
| | Image side surface 16 | 4.45 | 1.69 | | | 0.91 |
| Second lens 2 | Object side surface 25 | −0.75 | 0.57 | 1.64 | 23.5 | 1.11 |
| | Image side surface 26 | −1.08 | 0.10 | | | 1.31 |
| Third lens 3 | Object side surface 35 | 1.71 | 1.06 | 1.64 | 23.5 | 2.11 |
| | Image side surface 36 | 2.35 | 0.28 | | | 2.27 |
| Filter 9 | Object side surface 95 | Infinite | 0.21 | 1.52 | 64 | 3.00 |
| | Image side surface 96 | Infinite | 0.40 | | | 3.00 |
| Cover glass 10 | Object side surface 105 | Infinite | 0.40 | 1.52 | 64 | 3.00 |
| | Image side surface 106 | Infinite | 0.05 | | | 3.00 |
| Imaging plane 100 | | Infinite | 0.00 | | | 2.27 |

According to FIG. 3 and Table 3, the first lens 1 is a concavo-convex lens with a convex surface facing the object side A1, where the object side surface 15 thereof is the convex surface, and the image side surface 16 is a concave surface. The second lens 2 is a convexo-concave lens with a convex surface facing the image side A2, where the object side surface 25 thereof is a concave surface, and the image side surface 26 is the convex surface. The third lens 3 is a concavo-convex lens with a convex surface facing the object side A1, where the object side surface 35 thereof is the convex surface, and the image side surface 36 is a concave surface and has an inflection point. A center thickness CT3 of the third lens 3 is 1.06 mm, and an edge thickness ET3 is 0.50 mm, which satisfies a condition of 1.5<CT3/ET3<3.

In the embodiment, the imaging lens 1000 has a transmittance higher than 85% for light with a wavelength of 940 nm. A distance LT between the object side surface 15 of the first lens 1 and the image side surface 36 of the third lens 3 on the optical axis I is 4.16 mm, the distance D1 of the object side surface 15 of the first lens 1 is 2.0 mm, and an effective diameter DL of the image side surface 36 of the imaging lens 1000 closest to the image side A2 is 4.54 mm. The imaging lens 1000 satisfies conditions of D1/DL<0.6 and D1/LT<0.6.

Various aspheric coefficients in the embodiment are shown in Table 4 below.

TABLE 4

| Surface | R | K | $a_4$ | $a_6$ |
|---|---|---|---|---|
| 15 | 1.54 | 0.59 | 2.29E−02 | −1.61E−01 |
| 16 | 4.45 | 0.00 | 1.77E−02 | 3.14E−01 |
| 25 | −0.75 | −0.61 | 1.53E−01 | −4.09E−01 |
| 26 | −1.08 | −0.45 | −2.73E−01 | 6.20E−01 |
| 35 | 1.71 | −12.72 | −7.26E−02 | 5.15E−02 |
| 36 | 2.35 | −3.62 | −1.52E−01 | 4.51E−02 |

| Surface | $a_8$ | $a_{10}$ | $a_{12}$ | $a_{14}$ |
|---|---|---|---|---|
| 15 | 4.79E−01 | −7.19E−01 | 5.43E−01 | −1.59E−01 |
| 16 | −1.11E+00 | 2.44E+00 | −2.63E+00 | 1.19E+00 |
| 25 | 2.68E−01 | 8.42E−01 | −1.00E+00 | 3.40E−01 |
| 26 | −9.69E−01 | 9.39E−01 | −4.27E−01 | 7.51E−02 |
| 35 | −1.26E−02 | 6.68E−04 | 2.08E−04 | −2.78E−05 |
| 36 | 1.52E−03 | −3.11E−03 | 5.60E−04 | −3.37E−05 |

Figures 4A, 4B, 4C, 4D:
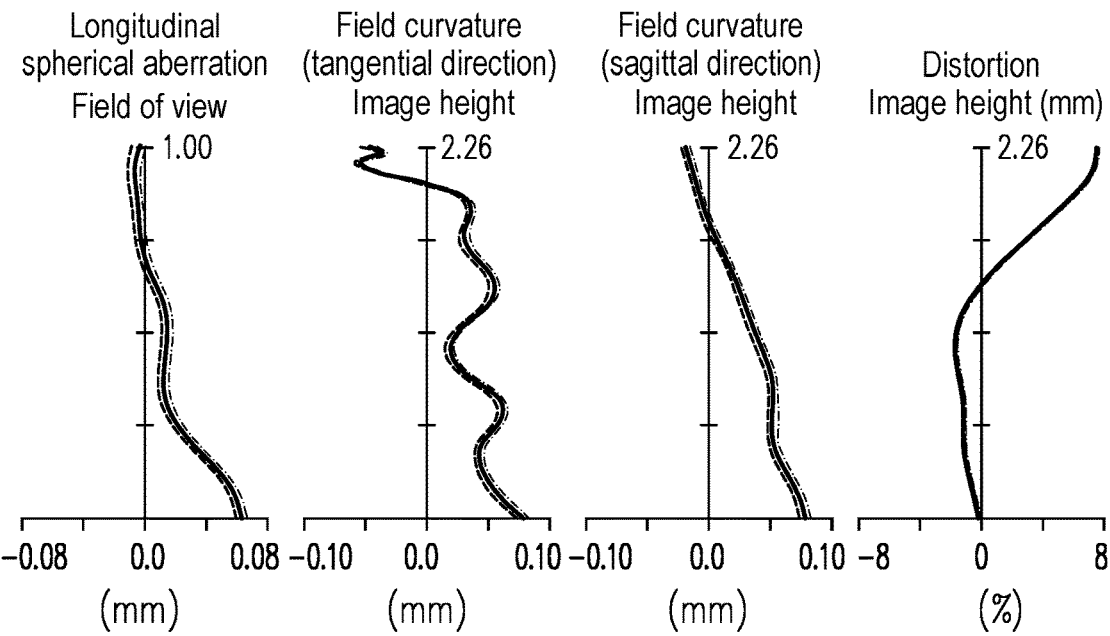
FIG. 4A to FIG. 4D are diagrams of longitudinal spherical aberration and various aberrations of the imaging lens of the second embodiment.

Referring to FIG. 4A to FIG. 4D, FIG. 4A illustrates a longitudinal spherical aberration of the second embodiment, FIG. 4B and FIG. 4C respectively illustrate a field curvature aberration in a tangential direction and a field curvature aberration in a Sagittal direction on the imaging plane 100 according to the second embodiment, and FIG. 4D illustrates a distortion aberration on the imaging plane 100 according to the second embodiment. In the longitudinal spherical aberration diagram of the second embodiment of FIG. 4A, it may be seen from a deflection amplitude of a curve of each representative wavelength that deviation of imaging points of off-axis rays of different heights is controlled within ±0.09 mm, so that the second embodiment does have good spherical aberration performance for the same wavelength. In addition, distances between the three representative wavelengths are also quite close to each other, which represents that imaging positions of light of different wavelengths are quite concentrated to achieve good chromatic aberration performance.

In the two field curvature aberration diagrams in FIG. 4B and FIG. 4C, the field curvature aberrations of the three representative wavelengths in the entire field of view fall within ±0.09 mm, which means that the optical system of the second embodiment may effectively eliminate aberrations. The distortion aberration diagram in FIG. 4D shows that the distortion aberration of the second embodiment is maintained within a range of ±8%, indicating that the distortion aberration of the second embodiment meets the imaging quality requirements of the optical system, so that compared with the existing imaging lens, the second embodiment uses three aspheric lenses, where one of them is a glass lens, to realize miniaturization of the imaging lens while satisfying the imaging quality requirements within the waveband of near infrared light and the temperature drift requirements.

Figure 5:
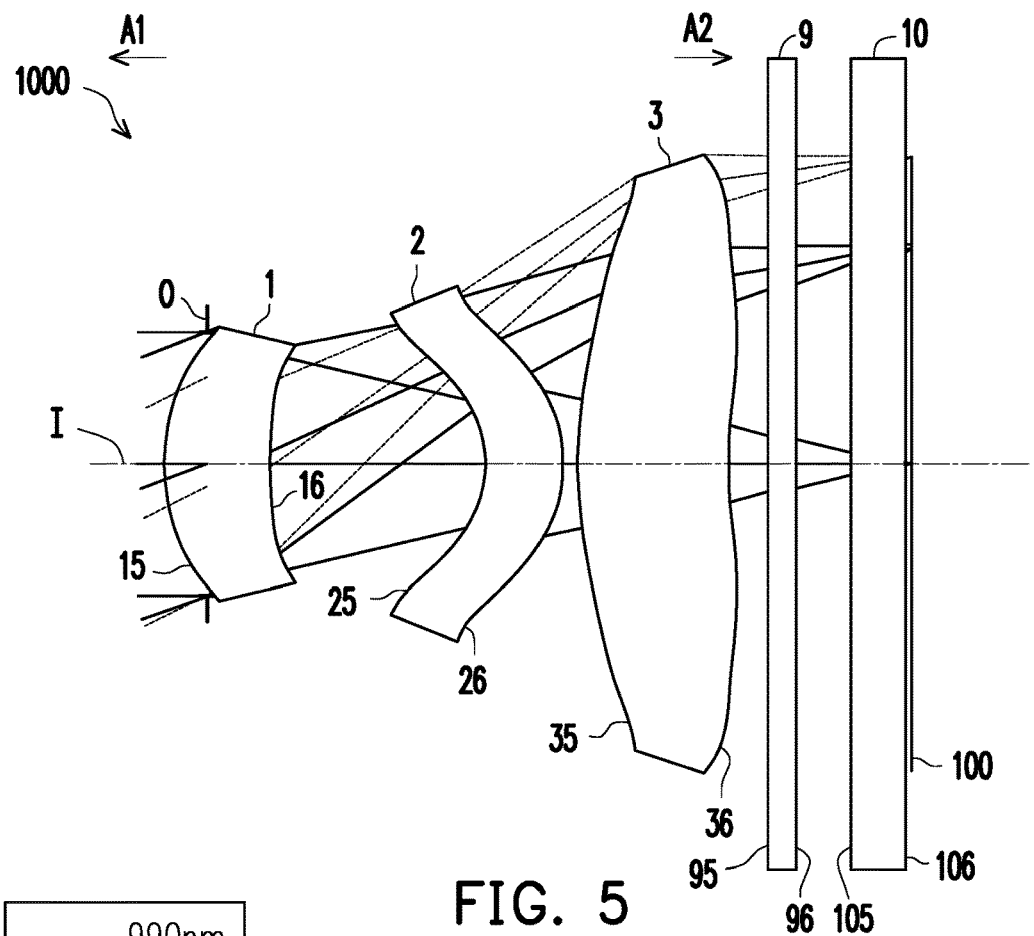
FIG. 5 is a schematic diagram of an imaging lens according to a third embodiment of the disclosure.

FIG. 5 is a schematic diagram of an imaging lens according to a third embodiment of the disclosure, and FIG. 6A to FIG. 6D are diagrams of longitudinal spherical aberration and various aberrations of the imaging lens of the third embodiment. Referring to FIG. 5, the imaging lens 1000 of the third embodiment of the disclosure includes the aperture stop 0, the first lens 1, the second lens 2, the third lens 3, the filter 9, and the cover glass 10 sequentially arranged along the optical axis I of the imaging lens 1000 from the object side A1 to the image side A2, where the first lens 1 is an aspheric glass lens, and the second lens 2 and the third lens 3 are aspheric plastic lenses.

The first lens 1 has a positive refracting power. Both of the object side surface 15 and the image side surface 16 of the first lens 1 are aspheric surfaces. The second lens 2 element has a negative refracting power. Both of the object side surface 25 and the image side surface 26 of the second lens 2 are aspheric surfaces. The third lens 3 has a positive refracting power. Both of the object side surface 35 and the image side surface 36 of the third lens 3 are aspheric surfaces.

Other detailed optical data of the third embodiment is shown in Table 5 below, and an effective focal length of the imaging lens 1000 of the third embodiment is 4.2 mm, a full field of view is 54°, a total lens length TTL of the imaging lens 1000 on the optical axis I is 5.5 mm, an F-number (Fno) is 2.1, and the maximum image height is 2.264 mm.

TABLE 5

Third embodiment
EFL = 4.2 mm, full FOV = 54°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Object | | Infinite | 751 | | | |
| Aperture stop 0 | | Infinite | 0.00 | | | 0.97 |
| First lens 1 | Object side surface 15 | 1.56 | −0.33 | 1.59 | 61 | 1.00 |
| | Image side surface 16 | 3.22 | 0.78 | | | 0.88 |
| Second lens 2 | Object side surface 25 | −0.78 | 1.59 | 1.64 | 23.5 | 1.10 |
| | Image side surface 26 | −1.12 | 0.57 | | | 1.30 |
| Third lens 3 | Object side surface 35 | 1.86 | 0.10 | 1.64 | 23.5 | 2.10 |
| | Image side surface 36 | 2.79 | 1.12 | | | 2.27 |

TABLE 5-continued

Third embodiment
EFL = 4.2 mm, full FOV = 54°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Filter 9 | Object side surface 95 | Infinite | 0.29 | 1.52 | 64 | 3.00 |
| | Image side surface 96 | Infinite | 0.40 | | | 3.00 |
| Cover glass 10 | Object side surface 105 | Infinite | 0.40 | 1.52 | 64 | 3.00 |
| | Image side surface 106 | Infinite | 0.05 | | | 3.00 |
| | Imaging plane 100 | Infinite | 0.00 | | | 2.27 |

According to FIG. 5 and Table 5, the first lens 1 is a concavo-convex lens with a convex surface facing the object side A1, where the object side surface 15 thereof is the convex surface, and the image side surface 16 is a concave surface. The second lens 2 is a convexo-concave lens with a convex surface facing the image side A2, where the object side surface 25 thereof is a concave surface, and the image side surface 26 is the convex surface. The third lens 3 is a concavo-convex lens with a convex surface facing the object side A1, where the object side surface 35 thereof is the convex surface, and the image side surface 36 is a concave surface and has an inflection point. A center thickness CT3 of the third lens 3 is 1.12 mm, and an edge thickness ET3 is 0.51 mm, which satisfies a condition of 1.5<CT3/ET3 <3.

In the embodiment, the imaging lens 1000 has a transmittance higher than 85% for light with a wavelength of 940 nm. A distance LT between the object side surface 15 of the first lens 1 and the image side surface 36 of the third lens 3 on the optical axis I is 4.16 mm, the distance D1 of the object side surface 15 of the first lens 1 is 2.0 mm, and an effective diameter DL of the image side surface 36 of the imaging lens 1000 closest to the image side A2 is 4.54 mm. The imaging lens 1000 satisfies conditions of D1/DL<0.6 and D1/LT<0.6.

Various aspheric coefficients in the embodiment are shown in Table 6 below.

TABLE 6

| Surface | R | K | $a_4$ | $a_6$ |
|---|---|---|---|---|
| 15 | 1.56 | 0.51 | 2.00E−02 | −1.10E−01 |
| 16 | 3.22 | 0.00 | 2.89E−02 | 3.05E−01 |
| 25 | −0.78 | −0.58 | 1.77E−01 | −5.00E−01 |
| 26 | −1.12 | −0.40 | −2.38E−01 | 5.17E−01 |
| 35 | 1.86 | −13.28 | −8.71E−02 | 6.78E−02 |
| 36 | 2.79 | −3.63 | −1.48E−01 | 4.52E−02 |

| Surface | $a_8$ | $a_{10}$ | $a_{12}$ | $a_{14}$ |
|---|---|---|---|---|
| 15 | 3.31E−01 | −4.86E−01 | 3.61E−01 | −1.02E−01 |
| 16 | −1.14E+00 | 2.72E+00 | −3.13E+00 | 1.50E+00 |
| 25 | 5.13E−01 | 4.55E−01 | −7.11E−01 | 2.60E−01 |
| 26 | −8.04E−01 | 7.95E−01 | −3.66E−01 | 6.54E−02 |
| 35 | −2.12E−02 | 3.03E−03 | −1.23E−04 | −9.01E−06 |
| 36 | 4.01E−04 | −2.80E−03 | 5.31E−04 | −3.28E−05 |

Figures 6A, 6B, 6C, 6D:
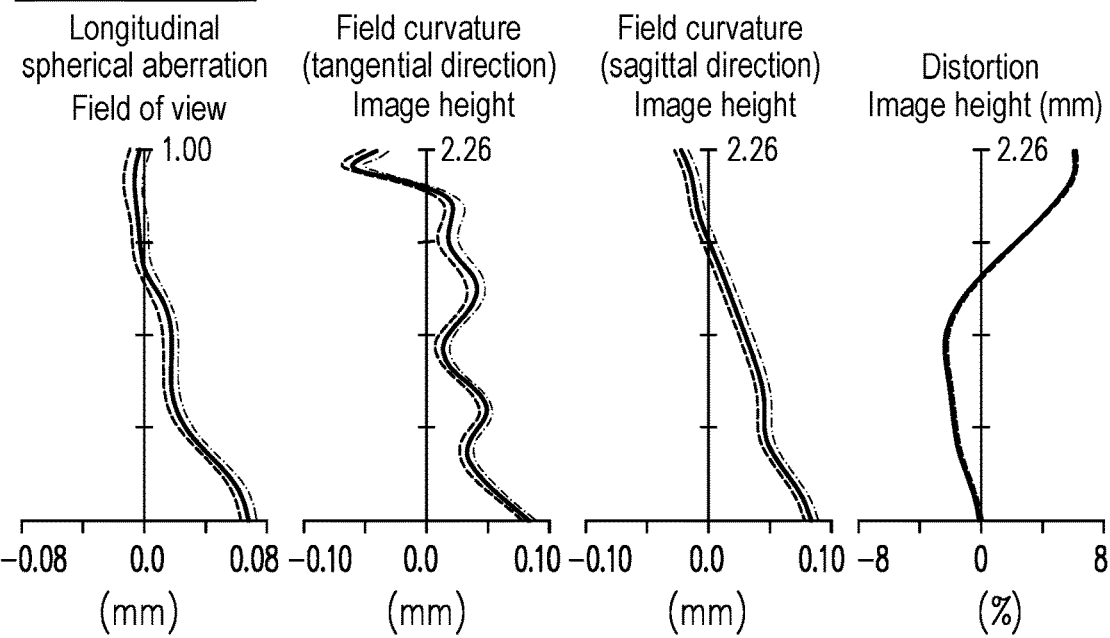
FIG. 6A to FIG. 6D are diagrams of longitudinal spherical aberration and various aberrations of the imaging lens of the third embodiment.

Referring to FIG. 6A to FIG. 6D, FIG. 6A illustrates a longitudinal spherical aberration of the third embodiment, FIG. 6B and FIG. 6C respectively illustrate a field curvature aberration in a tangential direction and a field curvature aberration in a Sagittal direction on the imaging plane 100 according to the third embodiment, and FIG. 6D illustrates a distortion aberration on the imaging plane 100 according to the third embodiment. In the longitudinal spherical aberration diagram of the third embodiment of FIG. 6A, it may be seen from a deflection amplitude of a curve of each representative wavelength that deviation of imaging points of off-axis rays of different heights is controlled within ±0.095 mm, so that the third embodiment does have good spherical aberration performance for the same wavelength. In addition, distances between the three representative wavelengths are also quite close to each other, which represents that imaging positions of light of different wavelengths are quite concentrated to achieve good chromatic aberration performance.

In the two field curvature aberration diagrams in FIG. 6B and FIG. 6C, the field curvature aberrations of the three representative wavelengths in the entire field of view fall within ±0.095 mm, which means that the optical system of the third embodiment may effectively eliminate aberrations. The distortion aberration diagram in FIG. 6D shows that the distortion aberration of the third embodiment is maintained within a range of ±7%, indicating that the distortion aberration of the third embodiment meets the imaging quality requirements of the optical system, so that compared with the existing imaging lens, the third embodiment uses three aspheric lenses, where one of them is a glass lens, to realize miniaturization of the imaging lens while satisfying the imaging quality requirements within the waveband of near infrared light and the temperature drift requirements.

Figure 7:
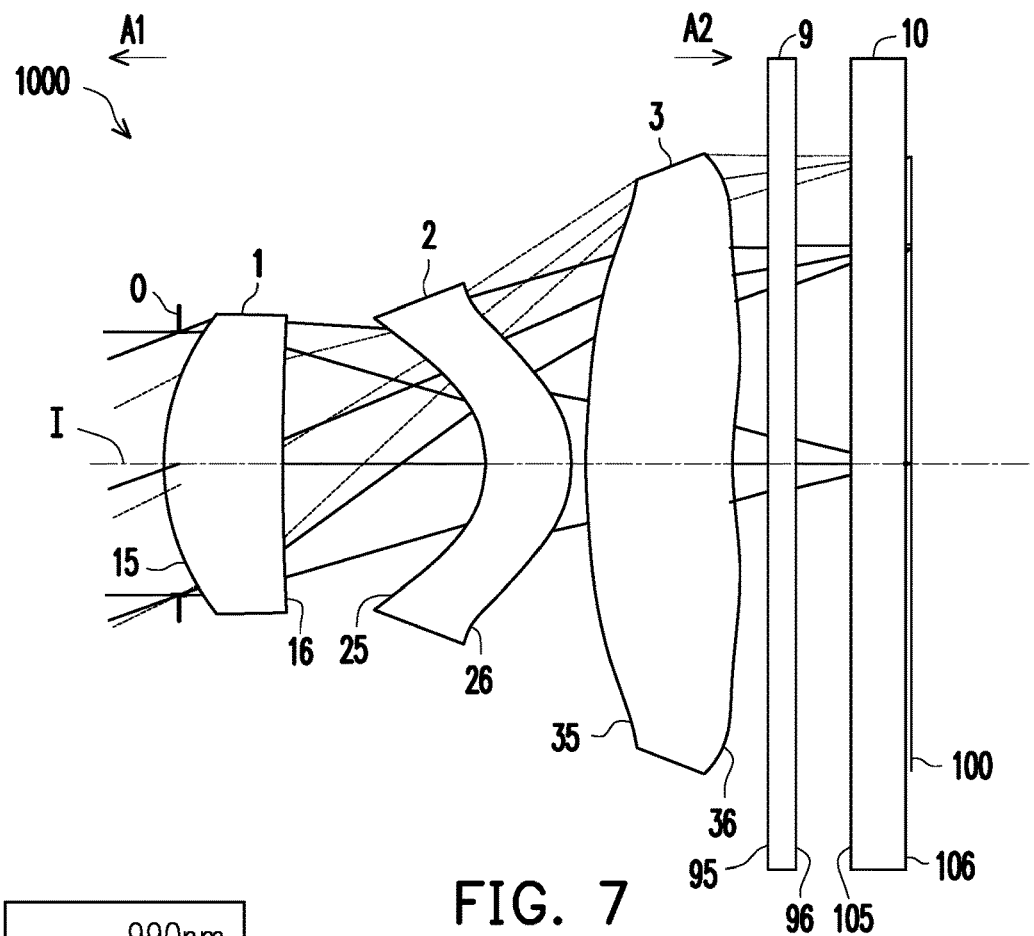
FIG. 7 is a schematic diagram of an imaging lens according to a fourth embodiment of the disclosure.

FIG. 7 is a schematic diagram of an imaging lens according to a fourth embodiment of the disclosure, and FIG. 8A to FIG. 8D are diagrams of longitudinal spherical aberration and various aberrations of the imaging lens of the fourth embodiment. Referring to FIG. 7, the imaging lens 1000 of the fourth embodiment of the disclosure includes the aperture stop 0, the first lens 1, the second lens 2, the third lens 3, the filter 9, and the cover glass 10 sequentially arranged along the optical axis I of the imaging lens 1000 from the object side A1 to the image side A2, where the first lens 1 is an aspheric glass lens, and the second lens 2 and the third lens 3 are aspheric plastic lenses.

The first lens 1 has a positive refracting power. Both of the object side surface 15 and the image side surface 16 of the first lens 1 are aspheric surfaces. The second lens 2 element has a positive refracting power. Both of the object side surface 25 and the image side surface 26 of the second lens 2 are aspheric surfaces. The third lens 3 has a negative refracting power. Both of the object side surface 35 and the image side surface 36 of the third lens 3 are aspheric surfaces.

Other detailed optical data of the fourth embodiment is shown in Table 7 below, and an effective focal length of the imaging lens 1000 of the fourth embodiment is 4.2 mm, a full field of view is 55°, a total lens length TTL of the imaging lens 1000 on the optical axis I is 5.5 mm, an F-number (Fno) is 2.1, and the maximum image height is 2.264 mm.

TABLE 7

Fourth embodiment
EFL = 4.1 mm, full FOV = 55°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Object |  | Infinite | 751 |  |  |  |
| Aperture stop 0 |  | Infinite | −0.11 |  |  | 0.97 |
| First lens 1 | Object side surface 15 | 1.69 | 0.87 | 1.50 | 82 | 1.10 |
|  | Image side surface 16 | 11.85 | 1.50 |  |  | 1.09 |
| Second lens 2 | Object side surface 25 | −0.72 | 0.62 | 1.64 | 23.5 | 1.07 |
|  | Image side surface 26 | −0.85 | 0.10 |  |  | 1.32 |
| Third lens 3 | Object side surface 35 | 4.23 | 1.09 | 1.64 | 23.5 | 2.10 |
|  | Image side surface 36 | 2.80 | 0.27 |  |  | 2.28 |
| Filter 9 | Object side surface 95 | Infinite | 0.29 | 1.52 | 64 | 3.00 |
|  | Image side surface 96 | Infinite | 0.40 |  |  | 3.00 |
| Cover glass 10 | Object side surface 105 | Infinite | 0.40 | 1.52 | 64 | 3.00 |
|  | Image side surface 106 | Infinite | 0.05 |  |  | 3.00 |
|  | Imaging plane 100 | Infinite | 0.00 |  |  | 2.27 |

According to FIG. 7 and Table 7, the first lens 1 is a concavo-convex lens with a convex surface facing the object side A1, where the object side surface 15 thereof is the convex surface, and the image side surface 16 is a concave surface. The second lens 2 is a convexo-concave lens with a convex surface facing the image side A2, where the object side surface 25 thereof is a concave surface, and the image side surface 26 is the convex surface. The third lens 3 is a convexo-concave lens with a convex surface facing the object side A1, where the object side surface 35 thereof is the convex surface, and the image side surface 36 is a concave surface and has an inflection point. A center thickness CT3 of the third lens 3 is 1.09 mm, and an edge thickness ET3 is 0.50 mm, which satisfies a condition of 1.5<CT3/ET3 <3.

In the embodiment, the imaging lens 1000 has a transmittance higher than 85% for light with a wavelength of 940 nm. A distance LT between the object side surface 15 of the first lens 1 and the image side surface 36 of the third lens 3 on the optical axis I is 4.18 mm, the distance D1 of the object side surface 15 of the first lens 1 is 2.2 mm, and an effective diameter DL of the image side surface 36 of the imaging lens 1000 closest to the image side A2 is 4.56 mm. The imaging lens 1000 satisfies conditions of D1/DL<0.6 and D1/LT<0.6.

Various aspheric coefficients in the embodiment are shown in Table 8 below.

TABLE 8

| Surface | R | K | $a_4$ | $a_6$ |
|---|---|---|---|---|
| 15 | 1.69 | −0.46 | 1.47E−02 | −2.15E−02 |
| 16 | 11.85 | 0.00 | −5.14E−03 | 4.05E−02 |
| 25 | −0.72 | −0.62 | −2.03E−02 | 1.25E−01 |
| 26 | −0.85 | −0.65 | 7.68E−03 | 2.30E−01 |
| 35 | 4.23 | −55.91 | 1.61E−02 | −1.77E−02 |
| 36 | 2.80 | −46.17 | −5.11E−02 | −1.10E−02 |

TABLE 8-continued

| Surface | $a_8$ | $a_{10}$ | $a_{12}$ | $a_{14}$ |
|---|---|---|---|---|
| 15 | 4.65E−02 | −4.13E−02 | 1.14E−02 | 1.06E−03 |
| 16 | −1.53E−01 | 2.49E−01 | −2.07E−01 | 6.56E−02 |
| 25 | −5.33E−01 | 1.91E+00 | −2.01E+00 | 7.12E−01 |
| 26 | −4.83E−01 | 6.22E−01 | −3.33E−01 | 6.57E−02 |
| 35 | 1.72E−02 | −6.89E−03 | 1.27E−03 | −9.13E−05 |
| 36 | 1.86E−02 | −6.09E−03 | 8.46E−04 | −4.57E−05 |

Figure 8A:
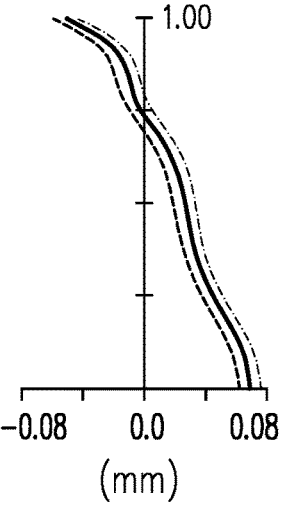
FIG. 8A to FIG. 8D are diagrams of longitudinal spherical aberration and various aberrations of the imaging lens of the fourth embodiment.
Figure 8B:
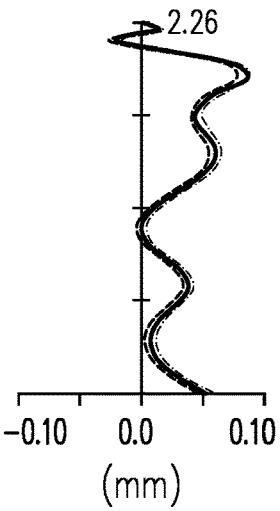
Figure 8C:
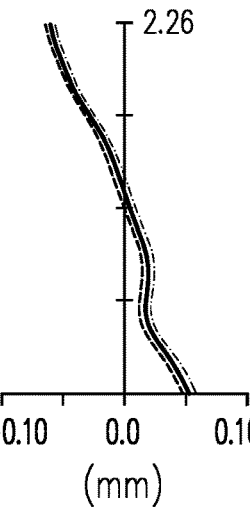
Figure 8D:
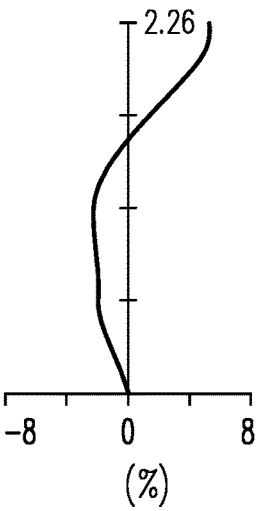

Referring to FIG. 8A to FIG. 8D, FIG. 8A illustrates a longitudinal spherical aberration of the fourth embodiment, FIG. 8B and FIG. 8C respectively illustrate a field curvature aberration in a tangential direction and a field curvature aberration in a Sagittal direction on the imaging plane 100 according to the fourth embodiment, and FIG. 8D illustrates a distortion aberration on the imaging plane 100 according to the fourth embodiment. In the longitudinal spherical aberration diagram of the fourth embodiment of FIG. 8A, it may be seen from a deflection amplitude of a curve of each representative wavelength that deviation of imaging points of off-axis rays of different heights is controlled within ±0.05 mm, so that the fourth embodiment does have good spherical aberration performance for the same wavelength. In addition, distances between the three representative wavelengths are also quite close to each other, which represents that imaging positions of light of different wavelengths are quite concentrated to achieve good chromatic aberration performance.

In the two field curvature aberration diagrams in FIG. 8B and FIG. 8C, the field curvature aberrations of the three representative wavelengths in the entire field of view fall within ±0.08 mm, which means that the optical system of the fourth embodiment may effectively eliminate aberrations. The distortion aberration diagram in FIG. 8D shows that the distortion aberration of the fourth embodiment is maintained within a range of ±7%, indicating that the distortion aberration of the fourth embodiment meets the imaging quality requirements of the optical system, so that compared with the existing imaging lens, the fourth embodiment uses three aspheric lenses, where one of them is a glass lens, to realize miniaturization of the imaging lens while satisfying the imaging quality requirements within the waveband of near infrared light and the temperature drift requirements.

Figure 9:
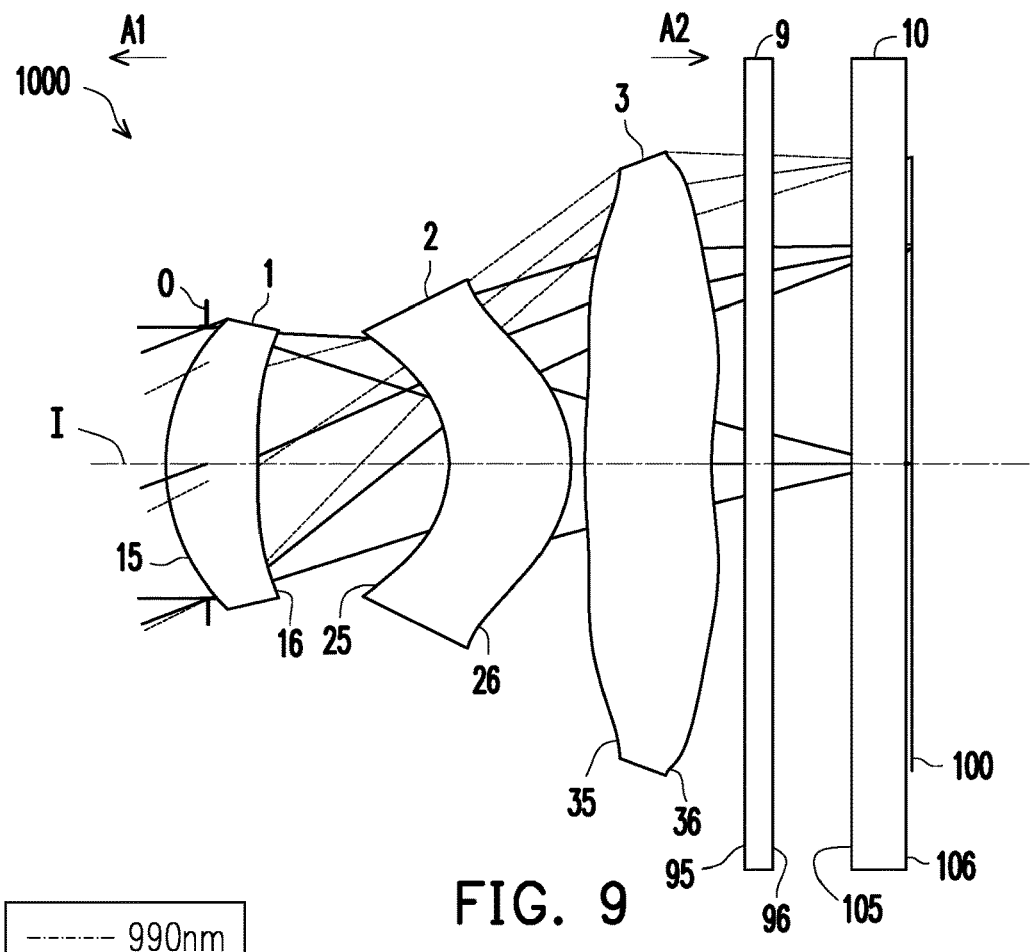
FIG. 9 is a schematic diagram of an imaging lens according to a fifth embodiment of the disclosure.

FIG. 9 is a schematic diagram of an imaging lens according to a fifth embodiment of the disclosure, and FIG. 10A to FIG. 10D are diagrams of longitudinal spherical aberration and various aberrations of the imaging lens of the fifth embodiment. Referring to FIG. 9 first, the imaging lens 1000 of the fifth embodiment of the disclosure includes the aperture stop 0, the first lens 1, the second lens 2, the third lens 3, the filter 9, and the cover glass 10 sequentially arranged along the optical axis I of the imaging lens 1000 from the object side A1 to the image side A2, where the first lens 1 is an aspheric glass lens, and the second lens 2 and the third lens 3 are aspheric plastic lenses.

The first lens 1 has a positive refracting power. Both of the object side surface 15 and the image side surface 16 of the first lens 1 are aspheric surfaces. The second lens 2 element has a positive refracting power. Both of the object side surface 25 and the image side surface 26 of the second lens 2 are aspheric surfaces. The third lens 3 has a negative refracting power. Both of the object side surface 35 and the image side surface 36 of the third lens 3 are aspheric surfaces.

Other detailed optical data of the fifth embodiment is shown in Table 9 below, and an effective focal length of the imaging lens 1000 of the fifth embodiment is 4.3 mm, a full field of view is 55°, a total lens length TTL of the imaging lens 1000 on the optical axis I is 5.5 mm, an F-number (Fno) is 2.1, and the maximum image height is 2.264 mm.

TABLE 9

Fifth embodiment
EFL = 4.3 mm, full FOV = 55°, TTL = 5.5 mm,
Fno = 2.1, Maximum image height = 2.264 mm

| Device | Surface | Radius of curvature (mm) | Space (mm) | Refractive index | Abbe No. | Half of diameter (mm) |
|---|---|---|---|---|---|---|
| Object | | Infinite | 751 | | | |
| Aperture stop 0 | | Infinite | −0.31 | | | 1.00 |
| First lens 1 | Object side surface 15 | 1.57 | 0.68 | 1.59 | 61 | 1.07 |
| | Image side surface 16 | 4.64 | 1.41 | | | 0.99 |
| Second lens 2 | Object side surface 25 | −0.88 | 0.90 | 1.64 | 23.5 | 0.97 |
| | Image side surface 26 | −1.15 | 0.10 | | | 1.36 |
| Third lens 3 | Object side surface 35 | 2.81 | 0.94 | 1.64 | 23.5 | 2.18 |
| | Image side surface 36 | 2.40 | 0.23 | | | 2.29 |
| Filter 9 | Object side surface 95 | Infinite | 0.21 | 1.52 | 64 | 3.00 |
| | Image side surface 96 | Infinite | 0.59 | | | 3.00 |
| Cover glass 10 | Object side surface 105 | Infinite | 0.40 | 1.52 | 64 | 3.00 |
| | Image side surface 106 | Infinite | 0.05 | | | 3.00 |
| Imaging plane 100 | | Infinite | 0.00 | | | 2.27 |

According to FIG. 9 and Table 9, the first lens 1 is a concavo-convex lens with a convex surface facing the object side A1, where the object side surface 15 thereof is the convex surface, and the image side surface 16 is a concave surface. The second lens 2 is a convexo-concave lens with a convex surface facing the image side A2, where the object side surface 25 thereof is a concave surface, and the image side surface 26 is the convex surface. The third lens 3 is a convexo-concave lens with a convex surface facing the object side A1, where the object side surface 35 thereof is the convex surface and has an inflection point, and the image side surface 36 is a concave surface and has an inflection point. A center thickness CT3 of the third lens 3 is 0.94 mm, and an edge thickness ET3 is 0.32 mm, which satisfies a condition of 1.5<CT3/ET3<3.

In the embodiment, the imaging lens 1000 has a transmittance higher than 85% for light with a wavelength of 940 nm. A distance LT between the object side surface 15 of the first lens 1 and the image side surface 36 of the third lens 3 on the optical axis I is 4.03 mm, the distance D1 of the object side surface 15 of the first lens 1 is 2.14 mm, and an effective diameter DL of the image side surface 36 of the imaging lens 1000 closest to the image side A2 is 4.58 mm. The imaging lens 1000 satisfies conditions of D1/DL<0.6 and D1/LT<0.6.

Various aspheric coefficients in the embodiment are shown in Table 10 below.

TABLE 10

| Surface | R | K | $a_4$ | $a_6$ |
|---|---|---|---|---|
| 15 | 1.57 | 0.26 | 6.44E−03 | −2.31E−02 |
| 16 | 4.64 | 0.00 | 1.10E−02 | 1.07E−01 |
| 25 | −0.88 | −0.46 | 1.11E−01 | −1.05E+00 |
| 26 | −1.15 | −0.47 | −3.04E−01 | 7.83E−01 |
| 35 | 2.81 | −3.09 | −4.21E−01 | 5.03E−01 |
| 36 | 2.40 | −0.62 | −3.30E−01 | 2.16E−01 |

| Surface | $a_8$ | $a_{10}$ | $a_{12}$ | $a_{14}$ |
|---|---|---|---|---|
| 15 | 5.10E−02 | −3.81E−02 | 5.76E−03 | 6.46E−03 |
| 16 | −3.54E−01 | 6.87E−01 | −6.42E−01 | 2.44E−01 |
| 25 | 2.70E+00 | −2.98E+00 | 1.64E+00 | −3.78E−01 |
| 26 | −1.37E+00 | 1.74E+00 | −1.36E+00 | 6.36E−01 |
| 35 | −3.27E−01 | 1.36E−01 | −3.69E−02 | 6.28E−03 |
| 36 | −9.86E−02 | 3.42E−02 | −8.59E−03 | 1.40E−03 |

| Surface | $a_{16}$ | $a_{18}$ |
|---|---|---|
| 15 | 0.00 | 0.00 |
| 16 | 0.00 | 0.00 |
| 25 | 0.00 | 0.00 |
| 26 | −1.66E−01 | 1.88E−02 |
| 35 | −0.000610192 | 2.57E−05 |
| 36 | −0.00012989 | 5.10E−06 |

Figures 10A, 10B, 10C, 10D:
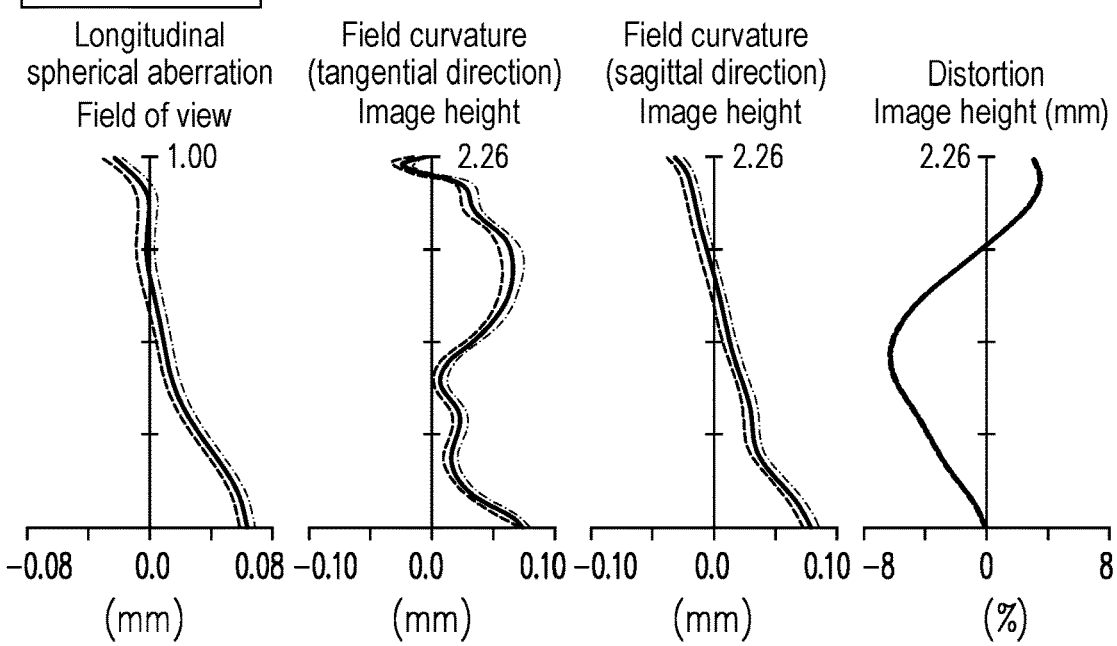
FIG. 10A to FIG. 10D are diagrams of longitudinal spherical aberration and various aberrations of the imaging lens of the fifth embodiment.

Referring to FIG. 10A to FIG. 10D, FIG. 10A illustrates a longitudinal spherical aberration of the fifth embodiment, FIG. 10B and FIG. 10C respectively illustrate a field curvature aberration in a tangential direction and a field curvature aberration in a Sagittal direction on the imaging plane 100 according to the fifth embodiment, and FIG. 10D illustrates a distortion aberration on the imaging plane 100 according to the fifth embodiment. In the longitudinal spherical aberration diagram of the fifth embodiment of FIG. 10A, it may be seen from a deflection amplitude of a curve of each representative wavelength that deviation of imaging points of off-axis rays of different heights is controlled within ±0.09 mm, so that the fifth embodiment does have good spherical aberration performance for the same wavelength.

In addition, distances between the three representative wavelengths are also quite close to each other, which represents that imaging positions of light of different wavelengths are quite concentrated to achieve good chromatic aberration performance.

In the two field curvature aberration diagrams in FIG. 10B and FIG. 10C, the field curvature aberrations of the three representative wavelengths in the entire field of view fall within ±0.09 mm, which means that the optical system of the fifth embodiment may effectively eliminate aberrations. The distortion aberration diagram in FIG. 10D shows that the distortion aberration of the fifth embodiment is maintained within a range of ±5%, indicating that the distortion aberration of the fifth embodiment meets the imaging quality requirements of the optical system, so that compared with the existing imaging lens, the fifth embodiment uses three aspheric lenses, where one of them is a glass lens, to realize miniaturization of the imaging lens while satisfying the imaging quality requirements within the waveband of near infrared light and the temperature drift requirements.

In summary, three aspheric lenses are adopted for the imaging lens provided by the embodiments of the disclosure, and one of the lenses is a glass lens. Thus, the lens is miniaturized, and the manufacturing cost can be reduced effectively. Meanwhile, the imaging quality requirements within the waveband of near infrared light as well as temperature drift requirements are satisfied.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An imaging lens, from an object side to an image side along an optical axis, sequentially comprising:
   a first lens, being an aspheric lens;
   a second lens, being an aspheric plastic lens; and
   a third lens, being an aspheric plastic lens,
   wherein a diameter of the second lens is smaller than a diameter of a the third lens,
   the imaging lens has a transmittance higher than 85% for light with a wavelength of 940 nm, and has a field of view less than 90 degrees, and
   the imaging lens satisfies a condition of D1/LT<0.62, wherein LT is a distance along an optical axis between a surface of the first lens facing an object side and a surface of the third lens facing the image side, and D1 is a diameter of an opening of an aperture stop.

2. The imaging lens as claimed in claim 1, wherein a refracting power of the first lens is positive, and refracting powers of the second lens and the third lens are respectively positive and positive, negative and positive, or positive and negative.

3. The imaging lens as claimed in claim 1, wherein the diameter of the third lens is greater than a diameter of the first lens.

4. The imaging lens as claimed in claim 1, wherein the imaging lens satisfies a condition of D1/DL<0.6, and DL is an effective diameter of a surface of the imaging lens closest to the image side.

5. The imaging lens as claimed in claim 1, wherein the imaging lens satisfies a condition of D1/LT<0.6.

6. The imaging lens as claimed in claim 1, wherein the imaging lens satisfies a condition of DL/LT<1.2, wherein DL is an effective diameter of a surface of the imaging lens closest to the image side.

7. The imaging lens as claimed in claim 1, wherein TTL of the imaging lens is 5.5 mm, a full field of view is within a range of 53° to 56°, IH is within a range of 2.25 mm to 2.27 mm, wherein TTL is a distance from an object side surface of the first lens close to the object side to an imaging plane, and IH is a maximum image height of the imaging lens.

8. The imaging lens as claimed in claim 1, wherein a color of the first lens is black.

9. An imaging lens, comprising:
   a first lens, being an aspheric-glass lens with a positive refracting power;
   a second lens and a third lens, being two aspheric lenses; and
   an aperture stop, located at an outermost side of all lenses of the imaging lens,
   wherein a distance between outer surfaces of two outermost lenses of the imaging lens is less than 4.2 mm, and a field of view of the imaging lens is less than 90 degrees,
   the imaging lens has a transmittance higher than 85% for light with a wavelength of 940 nm, and
   the imaging lens satisfies a condition of 0.67<EFL1/EFL<1.11 and a condition of DL/LT<1.2, wherein ELF1 is an effective focal length of the first lens, ELF is an effective focal length of the imaging lens, DL is an effective diameter of a surface of the imaging lens closest to an image side, and LT is a distance along an optical axis between a surface of the first lens facing an object side and a surface of the third lens facing the image side.

10. The imaging lens as claimed in claim 9, wherein the imaging lens satisfies a condition of 1.5<CT3/ET3<3, wherein CT3 is a center thickness of the third lens, and ET3 is an edge thickness of the third lens.

11. The imaging lens as claimed in claim 9, wherein the imaging lens satisfies a condition of D1/DL<0.6, D1 is a diameter of an opening of the aperture stop.

12. The imaging lens as claimed in claim 9, wherein the imaging lens satisfies a condition of D1/LT<0.6, wherein D1 is a diameter of an opening of the aperture stop.

13. The imaging lens as claimed in claim 9, wherein the imaging lens satisfies a condition of LT<4.2 mm.

14. The imaging lens as claimed in claim 9, wherein TTL of the imaging lens is 5.5 mm, a full field of view is within a range of 53° to 56°, IH is within a range of 2.25 mm to 2.27 mm, wherein TTL is a distance from an object side surface of the first lens close to the object side to an imaging plane, and IH is a maximum image height of the imaging lens.

15. An imaging lens, from an object side to an image side along an optical axis, sequentially comprising:
a first lens, a second lens and a third lens,
wherein the second lens and the third lens are both plastic lenses, and the first lens is a glass lens,
the imaging lens has a transmittance higher than 85% for light with a wavelength of 940 nm, and has a field of view less than 90 degrees, and
the imaging lens satisfies a condition of D1/LT<0.62, wherein D1 is a diameter of an opening of an aperture stop, and LT is a distance along the optical axis between a surface of the first lens facing the object side and a surface of the third lens facing the image side.

16. The imaging lens as claimed in claim 15, wherein the second lens is a convexo-concave lens.

17. The imaging lens as claimed in claim 15, wherein the imaging lens satisfies a condition of D1/DL<0.6, DL is an effective diameter of a surface of the imaging lens closest to the image side.

18. The imaging lens as claimed in claim 15, wherein the imaging lens satisfies a condition of D1/LT<0.6.

19. The imaging lens as claimed in claim 15, wherein the surface of the third lens facing the image side has an inflection point.

20. The imaging lens as claimed in claim 19, wherein a surface of the third lens facing the object side has an inflection point.

* * * * *